(12) United States Patent
Schweitzer

(10) Patent No.: US 9,471,354 B1
(45) Date of Patent: Oct. 18, 2016

(54) DETERMINING PROVENANCE OF VIRTUAL MACHINE IMAGES

(71) Applicant: Amazon Technologies, Inc., Reno, NV (US)

(72) Inventor: John Schweitzer, Virginia Beach, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/314,926

(22) Filed: Jun. 25, 2014

(51) Int. Cl.
*G06F 9/455* (2006.01)
*G06F 9/48* (2006.01)

(52) U.S. Cl.
CPC ......... *G06F 9/45533* (2013.01); *G06F 9/4843* (2013.01)

(58) Field of Classification Search
CPC .................... G06F 9/45533; G06F 9/4843
USPC ..................................... 718/1, 100
See application file for complete search history.

(56) References Cited

U.S. PATENT DOCUMENTS

| | | | | |
|---|---|---|---|---|
| 8,117,173 B2* | 2/2012 | Gurevich | .......... | G06F 17/30194 707/693 |
| 8,671,082 B1* | 3/2014 | Yadav | ............... | G06F 17/30156 707/692 |
| 2006/0155674 A1* | 7/2006 | Traut | ........................ | G06F 8/61 |
| 2006/0155735 A1* | 7/2006 | Traut | ....................... | G06F 9/445 |
| 2009/0249354 A1* | 10/2009 | Yamaguchi | ............. | G06F 9/485 718/106 |
| 2010/0057750 A1* | 3/2010 | Aasted | ............. | G06F 17/30067 707/E17.032 |
| 2010/0088699 A1* | 4/2010 | Sasaki | ........................ | G06F 8/63 718/1 |
| 2011/0218920 A1* | 9/2011 | Agrawal | ............ | G06Q 30/0283 705/50 |
| 2012/0005675 A1* | 1/2012 | de Waal | ............... | G06F 9/45558 718/1 |
| 2012/0158709 A1* | 6/2012 | Gaonkar | ............... | G06F 17/303 707/723 |
| 2012/0167087 A1* | 6/2012 | Lee | ........................... | G06F 8/63 718/1 |
| 2013/0263114 A1* | 10/2013 | Watkins | .............. | G06F 9/45558 718/1 |
| 2015/0199211 A1* | 7/2015 | Yang | .................... | G06F 9/45558 718/1 |

OTHER PUBLICATIONS

Ammons et al., "Virtual Machine Images as Structured Data: The Mirage Image Library", 2011.*
Wei et al., "Managing Security of Virtual Machine Images in a Cloud Environment", 2009.*
Groth et al., "Pipeline-Centric Provenance Model", 2009.*
Berriman et al., "The Application of Cloud Computing to the Creation of Image Mosaics and Management of Their Provenance", 2010.*

* cited by examiner

*Primary Examiner* — Phillip H Nguyen
(74) *Attorney, Agent, or Firm* — Davis Wright Tremaine LLP

(57) ABSTRACT

A virtual computer system service determines, for a selected virtual machine image, information that is generated based at least in part on the contents of the selected virtual machine image. The virtual computer system service may compare this information to other information obtained from other virtual machine images to determine a similarity score for each of these other virtual machine images. Based at least in part on these similarity scores, the virtual computer system service determines a provenance for the selected virtual machine image, which is provided to an administrator, customer or other entity.

20 Claims, 9 Drawing Sheets

DETERMINING PROVENANCE OF VIRTUAL MACHINE IMAGES

BACKGROUND

Computing technologies have evolved and continue to evolve to keep up with the demands of the organizations that use them. Many organizations, for example, utilize a virtual computer system service for, among other reasons, remotely operating one or more virtual machine instances. These virtual machine instances may be created using a virtual machine image that comprises a software configuration, which may include an operating system that defines the operating environment for the virtual machine instances. These virtual machine images may be modified and used to create new virtual machine images, which may be appealing to other customers of the virtual computer system service. Despite their many advantages, it may be difficult to determine the antecedents and descendants for each virtual machine image. Thus, if an issue is detected within a particular virtual machine image, it may be difficult to identify any other associated virtual machine images that may also be affected.

BRIEF DESCRIPTION OF THE DRAWINGS

Various embodiments in accordance with the present disclosure will be described with reference to the drawings, in which.

DETAILED DESCRIPTION

Figure 1:
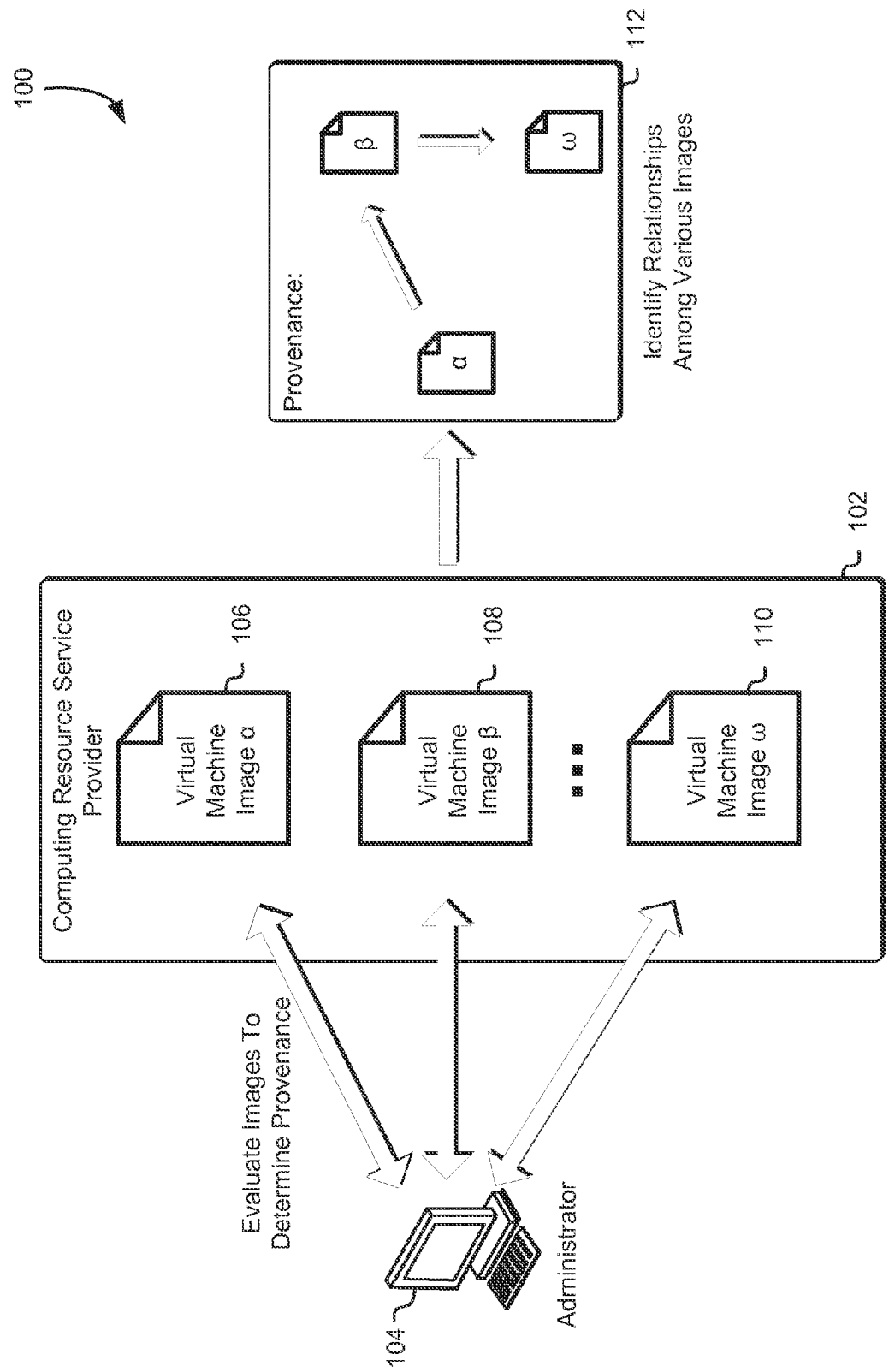
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to determining and maintaining the provenance of virtual machine images utilized to create virtual machine instances. In an embodiment, an entity (e.g., an organization) communicates with a virtual computer system service, such as through application programming interface (API) calls to the service, to request evaluation of virtual machine images to determine the provenance (e.g., a generational ordering that includes temporal relationships among one or more virtual machine images) for each of these virtual machine images. The entity may be an administrator employed by a computing resource service provider to manage and maintain the virtual computer system service and the virtual machine images stored therein. In some embodiments, the virtual computer system service evaluates the virtual machine images automatically and without administrator input. For instance, the virtual computer system service may be configured to evaluate these virtual machine images in response to a triggering event (e.g., detection of an issue associated with one of the virtual machine images) or at certain time intervals.

In an embodiment, the virtual computer system service selects a virtual machine image and determines the file structure associated with the selected virtual machine image. The virtual computer system service may select this virtual machine image based on certain criteria. For instance, if the administrator or the virtual computer system service detects an issue associated with a virtual machine image (e.g., a bug or other errors associated with a component of the virtual machine image), the virtual computer system service may select the affected virtual machine image to identify other virtual machine images that may also be affected by the issue. Once the virtual computer system service has identified the file structure for the selected virtual machine image, the virtual computer system service may compare this file structure to the file structure of other virtual machine images available. The virtual computer system service may, based on this comparison, generate a ranking of the virtual machine images. This ranking may be based on the similarity between the file structure of the selected virtual machine image and the file structure of each other virtual machine image compared. While virtual machine images are used throughout the present disclosure for the purpose of illustration, other blocks of data may be selected and compared, such as physical disk images, documents, compressed data files and the like.

For improved efficiency relative to a bit-by-bit comparison of virtual machine images, the virtual computer system service may dissect the selected virtual machine image into several data blocks and proceeds to hash these data blocks. Once the selected virtual machine image has been dissected, the virtual computer system service may compare these data block hashes to other virtual machine image data blocks to determine whether there are any similarities between the selected virtual machine image and the other virtual machine images. The virtual computer system service may generate a ranking of the other virtual machine images based on the data block hash similarities. The ranking of these other virtual machine images maybe be used to determine the provenance of the selected virtual machine image to all other virtual machine images.

In an embodiment, the virtual computer system service uses the provenance determined through either analysis of the file structure or data blocks of the virtual machine images to create an ordering (e.g., lineage tree) of these virtual machine images. The virtual computer system service may provide this ordering of virtual machine images to the administrator to enable the administrator to perform administrative actions, such as addressing issues related to the selected virtual machine image and any virtual machine image that may be an antecedent or descendant of the selected virtual machine image. Additionally, the virtual machine system service may provide this ordering of virtual machine images to customers of the computing resource service provider upon selection of a particular virtual machine image within a marketplace provided by the computing resource service provider. For instance, the virtual computer system service may generate, within a marketplace interface, a lineage tree that may illustrate the relationship between the selected virtual machine image and any antecedents and descendants of the selected virtual machine image.

In this manner, a provenance for a virtual machine image may be determined and provided to administrators of the virtual computer system service as well as customers of the computing resource service provider. In addition, the techniques described and suggested herein facilitate additional technical advantages. For instance, because, in some examples, the virtual computer system service generates a lineage tree for a virtual machine image in response to an issue that may be found within the virtual machine image, an administrator or the virtual computer system service may be able to identify other virtual machine images that may be also be vulnerable. This may enable an administrator to identify all customers that may be affected and prevent any potential issues for these customers.

FIG. 1 shows an illustrative example of an environment 100 in which various embodiments may be practiced. In the environment 100, a computing resource service provider 102 provides various computing resource services to customers of the computing resource service provider. The computing resource service provider 102 may be an organization that hosts various computing resources on behalf of one or more customers. For example, a computing resource service provider 102 may operate one or more facilities that are used to host various computing hardware resources, such as hardware servers, data storage devices, network devices and other equipment, such as server racks, networking cables and the like. The computing resource service provider 102 may utilize its computing hardware resources to operate one or more services. Such services may include services that enable customers of the computing resource service provider 102 to remotely manage computing resources to support the customers' operations while reducing the needs of the customers to invest in physical equipment. Example services include, but are not limited to, various data storage services (object-based data storage services, archival data storage services, database services and the like), identity management services, program execution services (virtual computer system services) and other services. The services may be used by customers to support a wide variety of activities, such as operating a website, operating enterprise systems supporting an organization, distributed computation and/or other activities.

As noted above, the computing resource service provider 102 and the services provided therein may be managed and maintained by one or more administrators employed by the computing resource service provider 102. Thus, the environment 100 includes an administrator 104. The administrator 104 may be an individual or organization that may utilize the computing resource service provider 102 and the virtual computer system service provided by the computing resource service provider 102 to evaluate and determine the provenance of one or more virtual machine images 106, 108, 110. For instance, in an embodiment, the administrator 104 may interact with an interface, provided by the virtual computer system service, to select a virtual machine image 106 for evaluation. The selected virtual machine image 106 may comprise an operating system and additional applications which may be used to support a virtual machine instance. This selected virtual machine image 106 may be included in a data store comprising a plurality of virtual machine images that may be utilized by the customers of the computing resource service provider 102 to instantiate a virtual machine instance. Additionally, the data store may be utilized by the administrator 104 to manage and maintain these virtual machine images. Thus, when an administrator 104 selects a virtual machine image 106, the virtual computer system service may perform one or more analyses to determine the provenance of the selected virtual machine image 106.

In an embodiment, the virtual computer system service managed by the computing resource service provider 102 determines the file structure of the selected virtual machine image 106 to determine the provenance of the selected virtual machine image 106. For instance, the virtual computer system service may analyze the logical organization of files and directories that include these files within the selected virtual machine image 106. For example, the virtual computer system service may analyze the logical tree structure of the selected virtual machine image 106 to identify the various directories, files and levels for these directories and files included therein. This may enable the virtual computer system service to generate, for the selected virtual machine image 106, a detailed graphical representation of the file structure included within the virtual machine image 106. While logical tree structures are used extensively throughout the present disclosure for the purpose of illustration, other data graphing methods may be utilized to analyze the file structure of a virtual machine image. For instance, if the virtual machine image is organized utilizing one or more pages, the virtual computer system service may utilize a cellular multi-list scheme to identify the location of various files and data stored within the virtual machine image 106.

Once the virtual computer system service has analyzed the selected virtual machine image 106 to determine its file structure, the virtual computer system service may analyze other virtual machine images 108, 110 available within the virtual machine image data store to generate a ranking of these virtual machine images 108, 110. This ranking may be based at least in part on the similarities between the file structure of the selected virtual machine image 106 and the other virtual machine images 108, 110 available within the virtual machine image data store. For instance, if the virtual computer system service has analyzed the logical tree structure of the virtual machine images 106, 108, 110, the virtual computer system service may identify the similarities among these virtual machine images based at least in part on the graphical representation of these virtual machine images. For example, for each virtual machine image 106, 108, 110, the logical tree structure may differ with regard to the particular nodes (e.g., files and/or directories) that comprise the virtual machine image. The ranking may be based at least in part on the hierarchical nature of the nodes included within the logical tree structures, starting at a root node for all virtual machine images 106, 108, 110 and analyzing the structures to identify any differences that may arise. A higher ranking may be assigned for less dissimilarity discovered deeper within the logical tree structures (e.g., further away from the root node).

In an alternative embodiment, the virtual computer system service dissects the selected virtual machine image 106 into one or more data blocks. The virtual computer system service may hash these data blocks and proceed to compare these hashed data blocks to other hashed data blocks within other virtual machine images 108, 110 to identify the similarities between the selected virtual machine image 106 and these other virtual machine images 108, 110. Similar to the file structure analysis detailed above, the virtual computer system service may rank these other virtual machine images 108, 110 based at least in part on the hash similarities between the data blocks comprising the selected virtual machine image 106 and each of the other virtual machine images 108, 110. If the analysis of the hashed data blocks yields little similarity between the selected virtual machine image 106 and the other virtual machine images 108, 110, the virtual computer system service may dissect these virtual machine images 106, 108, 110 further to produce smaller hashed data blocks. This may provide greater fidelity in determining the similarities inherent between the selected virtual machine image 106 and the other virtual machine images 108, 110.

Once the virtual computer system service has ranked the other virtual machine images 108, 110 based at least in part on the similarities between these virtual machine images and the selected virtual machine image 106, the virtual computer system service may determine the provenance 112 for the selected virtual machine image 106. For instance, as illustrated in FIG. 1, the virtual computer system service managed by the computing resource service provider 102 has determined, based at least in part on the ranking of the other virtual machine images 108, 110) that the selected virtual machine image 106 (e.g., Virtual Machine Image α) is an antecedent of the virtual machine image 108 (e.g., Virtual Machine Image β) and of the virtual machine image 110 (e.g., Virtual Machine Image ω). The provenance 112 identified by the virtual computer system service for the selected virtual machine image 106 may be provided to the administrator 104, who may utilize the provenance 112 for the selected virtual machine image 106 to perform one or more administrative actions, such as identifying the one or more virtual machine images that may be susceptible to a particular issue (e.g., a bug associated with one or more components of the virtual machine image 106, etc.), performing an update of the affected virtual machine images or other actions.

In an embodiment, the virtual computer system service utilizes the determined provenance 112 for the selected virtual machine image 106 to supplement the marketplace provided by the computing resource service provider 102 to enable customers to select a virtual machine image for instantiation. For instance, as will described in greater detail below in connection with FIG. 5, the virtual computer system service may generate a graphical representation of the determined provenance 112 within a marketplace interface that may be utilized by these customers. Thus, if a customer selected a virtual machine image, the marketplace interface may display the provenance 112 for the selected virtual machine image, displaying the antecedents and descendants of the selected virtual machine image. This may enable the customer to select other related virtual machine images if he/she desires to utilize a more recent or antedated virtual machine image for his virtual machine instance.

Figure 2:
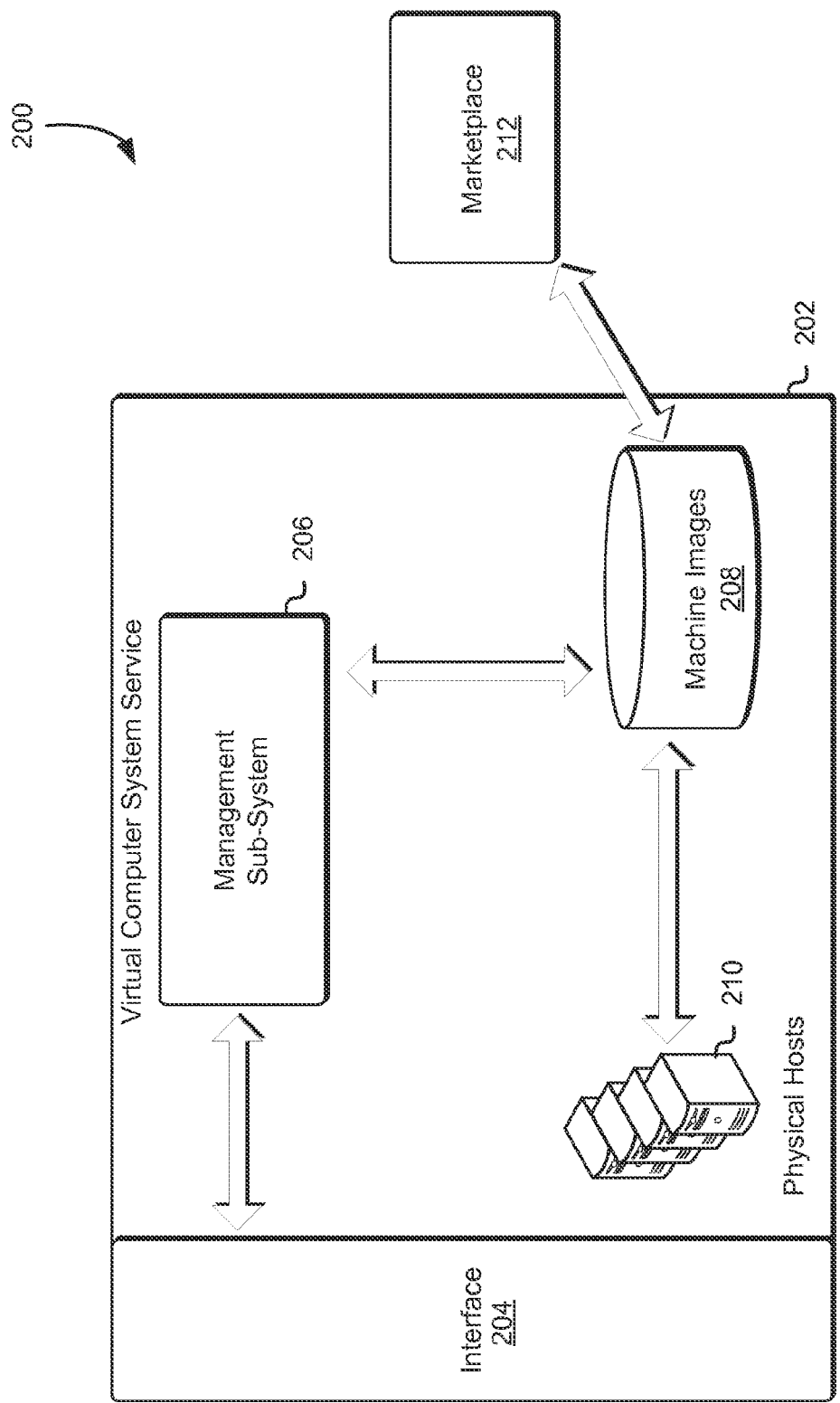
FIG. 2 shows an illustrative example of an environment that includes one or more components of a virtual computer system service in accordance with at least one embodiment.

As noted above, a virtual computer system service may be used by an administrator to analyze one or more virtual machine images in order to determine the provenance for each of these virtual machine images. The virtual computer system service may permit the administrator to select a virtual machine image for this analysis. Additionally, the virtual computer system service may provide a marketplace, which may enable customers to select a virtual machine image comprising an operating system and a variety of applications that may enable a customer to perform certain functions (e.g., maintain one or more databases, store client information, develop web applications, etc.). Accordingly, FIG. 2 shows an illustrative example of an environment 200 that includes one or more components of a virtual computer system service in accordance with at least one embodiment. The virtual computer system service 202 may provide administrators with an interface 204 that may enable an administrator to access the virtual computer system service 202. An administrator may utilize the interface 204 through one or more communications networks, such as the Internet. The interface 204 may contain certain security safeguards to ensure that the administrator has authorization to access the virtual computer system service 202. For instance, in order to access the virtual computer system service 202, an administrator may need to provide a username and a corresponding password or encryption key when using the interface 204. Additionally, requests (e.g., API calls) submitted to the interface 204 may require an electronic signature generated using a cryptographic key such that the electronic signature is verifiable by the virtual computer system service 202, such as by an authorization system (not shown).

Once the administrator has gained access to the virtual computer system service 202 through the interface 204, the virtual computer system service 202 may allow the administrator to interact, through the interface 204, with a management sub-system 206. For instance, the management sub-system 206 may enable the administrator to remotely manage and maintain one or more virtual machine images. Additionally, the management sub-system 206 may enable the administrator to select one or more virtual machine images in order to determine the provenance for each of these one or more virtual machine images. The virtual machine images may be maintained in data storage within a virtual machine image data store 208. When a customer submits a request for provisioning a virtual machine instance, the virtual computer system service 202 may identify the machine image the customer has requested and allocate the resources necessary (e.g., the processors and random-access memory (RAM) required to operate the components of the machine image) to process the machine image. The machine image may be instantiated on one or more physical storage devices (e.g., one or more servers or hard drives) that may act as a physical host 28 for the instance.

The machine images stored within the machine image data store 208 may be provided by one or more vendors of virtual machine images through a marketplace 212 provided by the computing resource service provider. These one or more vendors may utilize existing virtual machine images to generate new virtual machine images and make these available to other customers of the computing resource service provider. Thus, these newly generated virtual machine images may be descendants of existing virtual machine images. In an embodiment, an administrator utilizes the interface 204 to identify the virtual machine images stored within the virtual machine image data store 208 for a variety of purposes. For instance, the administrator may utilize the interface 204 to select one or more virtual machine images to cause the management sub-system 206 to determine the provenance for each of these selected virtual machine images. In an alternative embodiment, the management sub-system 206 is configured to determine the provenance for each virtual machine image stored within the virtual machine image data store 208 at certain time intervals and/or in response to a triggering event (e.g., detection of an issue associated with a virtual machine image, creation of a new virtual machine image, etc.).

In an embodiment, the management sub-system 206 selects a virtual machine image from the virtual machine image data store 208 to determine the file structure of the selected virtual machine image and determine the provenance for the selected virtual machine image. The management sub-system 206 may utilize one or more heuristics to identify the logical data tree structure of the selected virtual machine image to determine the file structure. For instance, the management sub-system 206 may begin determining the file structure of the virtual machine image by selecting a root directory of the image and determining the files and directories that may be included therein. If there is a directory present, the management sub-system 206 may access the directory and proceed further into the virtual machine image file structure until the management sub-system 206 identifies a terminal node within the logical data tree structure (e.g., a location within the virtual machine image that does not include any additional directories). The management sub-system 206 may graph the logical data tree structure for the selected virtual machine image up to these terminal nodes for all directories.

Once the management sub-system 206 has identified the file structure of the selected virtual machine image, the management sub-system 206 may compare this file structure to the file structures of the other virtual machine images stored within the virtual machine image data store 208 in order to identify any similarities and differences between the selected virtual machine image and the other virtual machine images. The management sub-system 206 may rank these other virtual machine images based at least in part on a measure of similarity between the selected virtual machine image and the other virtual machine images. For instance, a virtual machine image may be ranked higher if the file structure is nearly identical to the selected virtual machine image, such that the only differences present may be in the presence or omission of additional files within the logical data tree structure. However, if a virtual machine image includes a vastly different logical data tree structure, this virtual machine image may be ranked lower.

For example, in order to measure the similarity between the selected virtual machine image and another virtual machine image, the management sub-system 206 may overlay the tree representing the file structure of the other virtual machine image over the tree representing the file structure of the selected virtual machine image to identify any existing differences between these virtual machine images. The overlay of these representations of file structures may reveal one or more files and/or directories that may have been added and/or deleted. The management sub-system 206 may generate a set of measurements for each of these virtual machine images. For instance, the management sub-system 206 may calculate a similarity score for the other virtual machine image based at least in part on any identified differences (e.g., added/deleted files and/or directories, alternative time stamps for certain files, etc.) and the location of these differences within the file structures. For instance, the management sub-system 206 may be configured to calculate the tree edit distance between the selected virtual machine image and another virtual machine image. This edit distance may be based at least in part on one or more hypothetical operations that may need to be performed to transform the selected virtual machine image file structure into the file structure of the other virtual machine image. For instance, if the file structure for the selected virtual machine image can be transformed into the file structure of the other virtual machine image by eliminating a single node, then the edit distance is one. While edit distances are used extensively throughout the present disclosure for the purpose of illustration, other similarity measurements may be performed. For instance, in some embodiments, the management sub-system 206 may transform the tree representation of the file structures into different data structures, upon which one or more linear calculations may be performed to isolate the differences between the virtual machine images and obtain a similarity score.

In an alternative embodiment, the management sub-system 206 dissects the selected virtual machine image into one or more data blocks, which may then be hashed for analysis. These hashed data blocks may be compared to the hashed data blocks of other virtual machine images stored within the virtual machine image data store 208 to identify the similarities and differences between the selected virtual machine image and the other virtual machine images. For instance, the management sub-system 206 may perform a parallel analysis of this block structure and note any differences between the selected virtual machine image and the other virtual machine images within the virtual machine image data store 208. The management sub-system 206 may be able to identify any deviation from the block structure. For instance, if the dissection of the other virtual machine images within the virtual machine image data store 208 yields substantial differences between these and the selected virtual machine image, the management sub-system 206 may attempt to identify the initial hashed data block of the selected virtual machine image within the other virtual machine images to ensure any analysis yields more accurate results. Based at least in part on the similarities and differences between the selected virtual machine image and the other virtual machine images within the virtual machine image data store 208, the management sub-system 206 may rank these other virtual machine images.

With regard to comparisons between hashed data blocks, the management sub-system 206 may utilize a Jaccard index to calculate the similarity among the virtual machine images. For instance, the management sub-system 206 may determine the intersection (e.g., number of similar hashed data blocks) of the selected virtual machine image and another virtual machine image. Subsequently, the management sub-system 206 may divide the value of the intersection by the total number of hashed data blocks included in both virtual machine images to obtain the Jaccard index for the similarities between these two virtual machine images. For instance, if the Jaccard index for two virtual machine images is one, then the two virtual machine images are identical. Thus, a lower Jaccard index may indicate greater dissimilarity between the two analyzed virtual machine images. While a Jaccard index calculation is used extensively throughout the present disclosure for the purpose of illustration, other methods may be used to determine the similarity between hashed data blocks for two virtual machine images. For instance, in some embodiments, the management sub-system 206 may generate weighted similarity scores based at least in part on similarities/differences identified for particular hashed data blocks. For example, if the identified issue affecting the selected virtual machine image has been isolated to one or more particular hashed data blocks, any differences/similarities identified corresponding to these particular hashed data blocks may have greater effect on the similarity score than other differences/similarities identified.

Once the management sub-system 206 has ranked the virtual machine images stored within the virtual machine image data store 208, the management sub-system 206 may identify the provenance for the selected virtual machine image based at least in part on this ranking. For instance, the management sub-system 206 may identify a virtual machine image as an immediate antecedent or descendant of the selected virtual machine image if the virtual machine image is ranked highly. Alternatively, if a virtual machine image is not ranked, then this virtual machine image may not be considered as part of the lineage of the selected virtual machine image. The ranking of the virtual machine images may include a limited number of positions, thereby potentially eliminating any sufficiently dissimilar virtual machine images from being considered as being part of the lineage of the selected virtual machine image. The management sub-system 206 may generate, within metadata for the selected virtual machine image, data specifying the antecedents and descendants of the selected virtual machine image. Additionally, the management sub-system 206 may provide, through the interface 204, the provenance for the selected virtual machine image to the administrator upon demand or in a report provided to the administrator at certain time intervals or in response to a triggering event.

As noted above, customers of the computing resource service provider may utilize the marketplace 212 to select a virtual machine image for instantiation. In an embodiment, when a customer selects a virtual machine image, the marketplace 212 accesses the virtual machine image data store 208 to obtain the metadata for the selected virtual machine image. Using this metadata, the marketplace 212 may generate a graphical representation of the provenance for the selected virtual machine image. This may enable the customer to immediately identify any antecedents and descendants of the selected virtual machine image. Additionally, this may enable the customer to select any of these antecedents or descendants if the customer wants to utilize an alternative version of the virtual machine image.

Figure 3:
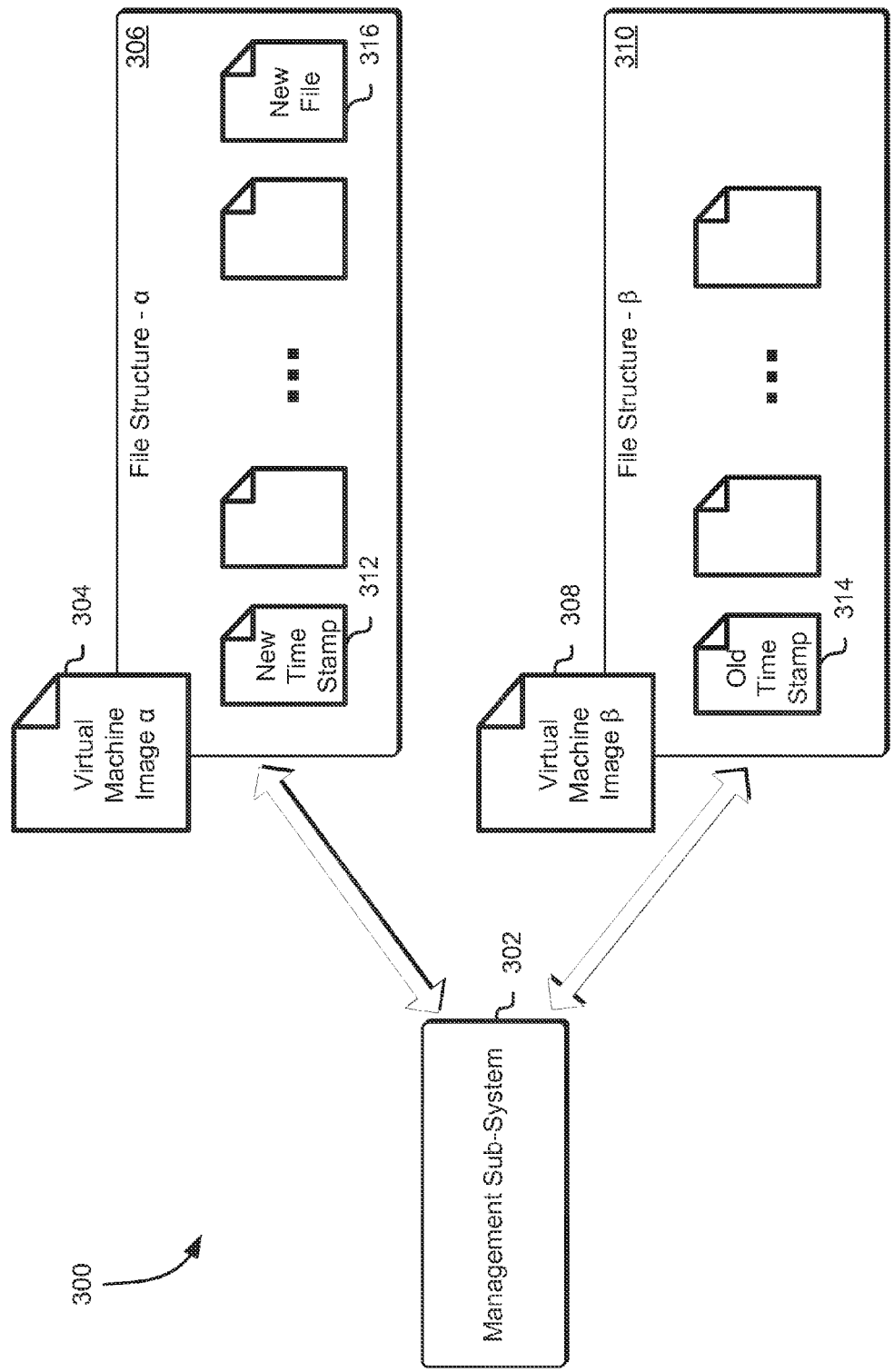
FIG. 3 shows an illustrative example of an environment that includes an analysis of virtual machine images based at least in part on the file structure of the virtual machine images in accordance with at least one embodiment.

As noted above, the management sub-system of the virtual computer system service may be configured to identify the file structure for one or more virtual machine images in order to determine the provenance for each of these virtual machine images. Accordingly, FIG. 3 shows an illustrative example of an environment 300 that includes an analysis of virtual machine images based at least in part on the file structure of the virtual machine images in accordance with at least one embodiment. As noted above, the management sub-system 302 may select a virtual machine image 304 (e.g., Virtual Machine Image α) based at least in part on one or more criteria. For instance, the management sub-system 302 may receive, from an administrator, a request to determine the provenance for the selected virtual machine image 304 in response to detection of an issue affecting this selected virtual machine image 304. Alternatively, the management sub-system 302 may select this virtual machine image 304 based at least in part on an inspection cycle or in response to a customer having selected the virtual machine image 304 from a marketplace.

The management sub-system 302 may utilize the selected virtual machine image 304 to determine the file structure 306 of this virtual machine image 304. In an embodiment, the management sub-system 302 utilizes one or more heuristics to identify a logical data tree structure for the selected virtual machine image 304. For instance, the management sub-system 302 may begin analyzing the file structure of the virtual machine image by starting at a top-level root directory of the selected virtual machine image 304 and determine the files and directories that may be included therein. If there is a directory present within this top-level root directory, the management sub-system 302 may access the directory and proceed further into the virtual machine image file structure until the management sub-system 302 identifies a terminal node within the logical data tree structure (e.g., a location within the virtual machine image file structure that does not include any additional directories or lower levels). The management sub-system 302 may graph the logical data tree structure for the selected virtual machine image 304 up to these terminal nodes for all directories. Additionally, the management sub-system 302 may record any additional information with regard to these directories and files. For instance, the management sub-system 302 may, for each file and directory, note the time stamp at which time the file or directory was created or modified.

Once the management sub-system 302 has determined the file structure 306 of the selected virtual machine image 304, the management sub-system 302 may utilize one or more heuristics to identify the file structure 38 of any other virtual machine images 308 stored within the virtual machine image data store. For instance, as illustrated in FIG. 3, the management sub-system 302 has utilized the one or more heuristics to identify the file structure 38 for an additional virtual machine image 308 (e.g., Virtual Machine Image β). As before, the management sub-system 302 may begin analyzing the file structure of these other virtual machine images by starting at the top-level root directory and determining the files and directories included therein. Once the management sub-system 302 has identified the logical data tree structure for these other virtual machine images, the management sub-system 302 may compare these logical data tree structures to the logical data tree structure of the selected virtual machine image 304 to determine the similarities and differences between the selected virtual machine image 304 and these other virtual machine images. This may enable the management sub-system 302 to rank these other virtual machine images based at least in part on these similarities.

As illustrated in FIG. 3, the management sub-system 302 has determined that the selected virtual machine image 304 (e.g., Virtual Machine Image α) includes a file 312 with a newer time stamp than one included in a different virtual machine image 308 (e.g., Virtual Machine Image β). Additionally, the selected virtual machine image 304 includes a new file 316 that is not included within the different virtual machine image 308 (e.g., the different virtual machine image 308 includes a similar file 314 with an older time stamp). If the management sub-system 302 determines that aside from the alternative time stamp and the new file 316 that these two virtual machine images 304, 308 share similar logical data tree structures, the management sub-system 302 may rank the different virtual machine image 308 highly. Further, based at least in part on the presence of the new file 316 and a file 312 with a new time stamp, the management sub-system 302 may determine that the different virtual machine image 308 is an antecedent of the selected virtual machine image 304.

In some embodiments, the management sub-system 302 may evaluate three or more virtual machine images in order to determine the provenance (e.g., generational ordering) for each of these three or more virtual machine images. The evaluation of three or more virtual machine images may be performed in the absence of any temporal information (e.g., time stamps or other temporal references). For instance, the management sub-system 302 may determine, for a first virtual machine image, such as the virtual machine image 304, first information that may be generated based at least in part on the contents (e.g., files and other data) of the first virtual machine image. Next, the management sub-system 302 may determine, for a second virtual machine image, such as the virtual machine image 306, second information that may be generated based at least in part on the contents of the second virtual machine image. In order to determine a generational ordering for a particular virtual machine image, the management sub-system 302 may further determine, for a third virtual machine image of a set of third virtual machine images third information that is generated based at least in part on contents of each virtual machine image of this third set of virtual machine images. With the information garnered from these three or more virtual machine images, the management sub-system 302 may be able to generate similarity scores for the second and each third virtual machine images and, based at least in part on these similarity scores, determine a generational ordering (e.g., temporal relationship) among these three or more virtual machine images.

For example, in an embodiment, the management sub-system 302 determines the file structure of three or more virtual machine images to identify the generational ordering for each of these three or more virtual machine images. For instance, as a virtual machine image is modified to generate a new virtual machine image, elements of the original virtual machine image may be preserved within the newly generated virtual machine image. The management sub-system 302 may identify, within these three or more virtual machine images, a succession of changes to the file structure. For instance, any successive changes to a virtual machine image are preserved within successive generations of the virtual machine image. Thus, by evaluating these three or more virtual machine images to identify a succession of changes to the file structure, the management sub-system 302 may be able to determine a generational (e.g., temporal) ordering for these three or more virtual machine images. Similarly, changes to blocks of a virtual machine image may be preserved from generation to generation, thereby allowing for generational ordering by examining when changes preserved among multiple generations were introduced into a set of three or more virtual machine images.

Once the management sub-system 302 has determined the provenance for the selected virtual machine image 304, the management sub-system 302 may generate metadata that may be included with the selected virtual machine image 304 to specify the provenance for this selected virtual machine image 304. The management sub-system 302 may further provide the provenance for this selected virtual machine image 304 to an administrator upon demand or in response to a triggering event (e.g., detection of an issue associated with the virtual machine image 304). This metadata may also be made available to a marketplace provided by the virtual computer system service. Thus, if a customer selected this virtual machine image 304, the marketplace may retrieve the metadata associated with the selected virtual machine image 304 and provide, to the customer, a graphical representation of the provenance for the selected virtual machine image 304.

Figure 4:
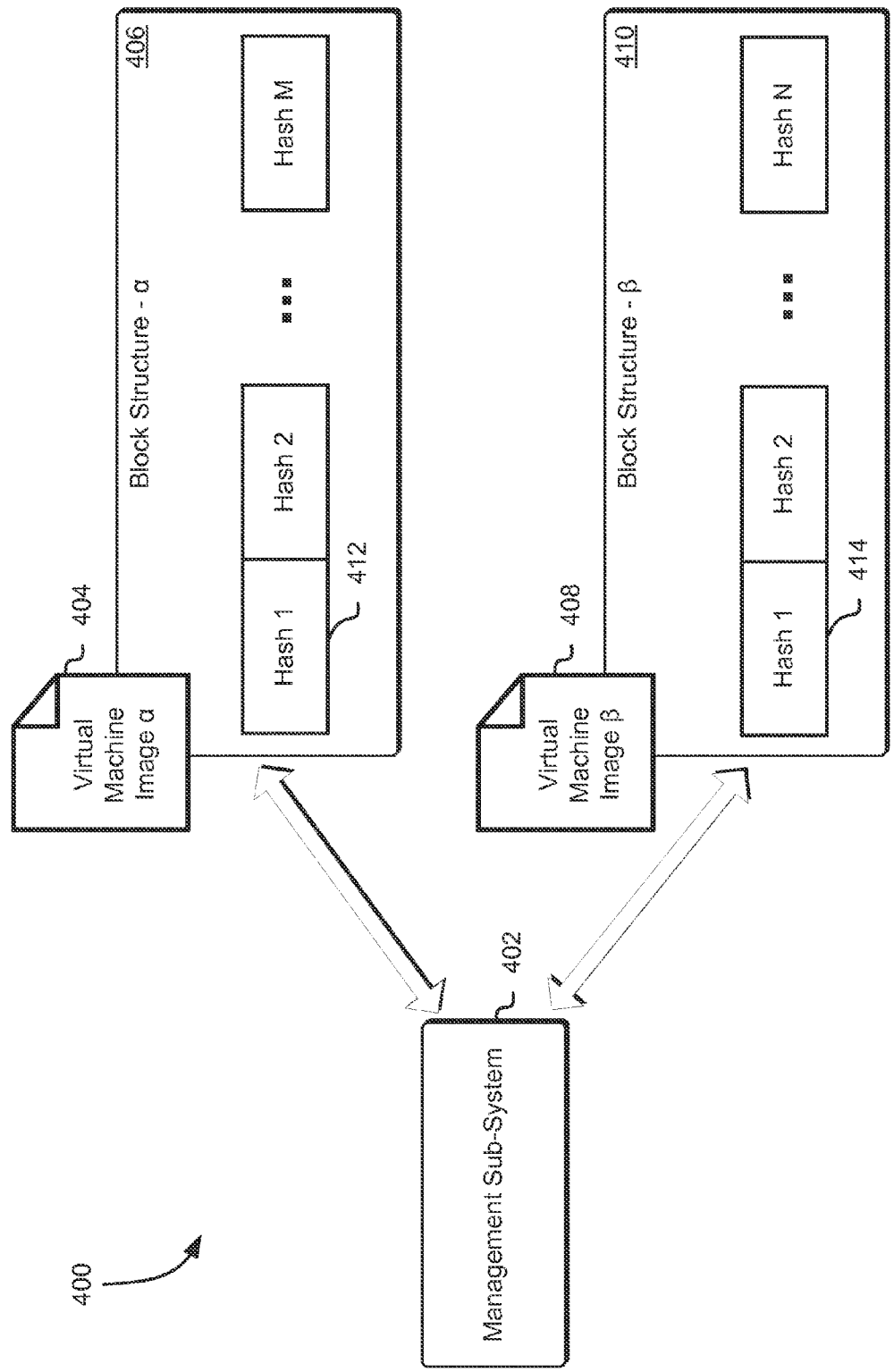
FIG. 4 shows an illustrative example of an environment that includes an analysis of virtual machine images based at least in part on hashing of the blocks that comprise the virtual machine images in accordance with at least one embodiment.

As noted above, the management sub-system may alternatively dissect a virtual machine image into one or more data blocks and hash these data blocks. These hashed data blocks may be compared to hash data blocks for other virtual machine images to determine the provenance of the selected virtual machine image. Accordingly, FIG. 4 shows an illustrative example of an environment 400 that includes an analysis of one or more virtual machine images based at least in part on hashing of data blocks that comprise these one or more virtual machine images in accordance with at least one embodiment. As noted above, and as described above in connection with FIG. 3, the management sub-system 402 may select a virtual machine image 404 (e.g., Virtual Machine Image α) based at least in part on one or more criteria. For instance, the management sub-system 402 may receive, from an administrator, a request to determine the provenance for the selected virtual machine image 404 in response to detection of an issue (e.g., one or more bugs or other software issues associated with the virtual machine image 404) affecting this selected virtual machine image 404. Alternatively, the management sub-system 402 may select this virtual machine image 404 based at least in part on an inspection cycle or in response to a customer having selected the virtual machine image 404 from a marketplace.

The management sub-system 402 may utilize the selected virtual machine image 404 to dissect this virtual machine image 404 into one or more data blocks and determine its block structure 406. The management sub-system 402 may determine the size of these data blocks based at least in part on the amount of fidelity desired in determining similarities and differences among virtual machine images included within the virtual machine image data store. For instance, the selected virtual machine image 404 may be dissected into smaller data blocks if greater fidelity is desired at the expense of processing time. Alternatively, the virtual machine image 404 may be dissected into larger data blocks for reduced fidelity, which may improve processing time but may provide coarse detail with regard to any similarities and/or differences among the virtual machine images. Once the management sub-system 404 has dissected the selected virtual machine image 104 into one or more data blocks, the management sub-system 402 may hash these data blocks to create one or more hashed data blocks 412 for the selected virtual machine image 404.

The management sub-system 402 may compare these hashed data blocks 412 for the selected virtual machine image 404 to other block structures 48, each comprising one or more hashed data blocks 408 for its respective virtual machine images 408 (e.g., Virtual Machine Image β, etc.). This may enable the management sub-system 402 to determine the similarities and differences between the selected virtual machine image 404 and any other virtual machine image 408 within the virtual machine image data store. For instance, the management sub-system 402 may perform a parallel analysis of the hashed data blocks 412, 414 to determine whether any hashes are different. The management sub-system 402 may identify these differences and produce a ranking of these other virtual machine images 408 based at least in part on these differences/similarities.

Based at least in part on these identified differences and similarities, the management sub-system 402 may be able to determine the provenance for the selected virtual machine image 404. Accordingly, the management sub-system 402 may generate metadata that may be included with the selected virtual machine image 404 to specify the provenance for this selected virtual machine image 404. The management sub-system 402 may further provide the provenance for this selected virtual machine image 404 to an administrator upon demand or in response to a triggering event (e.g., detection of an issue associated with the virtual machine image 404). This metadata may also be made available to a marketplace provided by the virtual computer system service. Thus, if a customer selected this virtual machine image 404, the marketplace may retrieve the metadata associated with the selected virtual machine image 404 and provide, to the customer, a graphical representation of the provenance for the selected virtual machine image 404.

In some embodiments, the management sub-system 402 may analyze three or more virtual machine images in order to determine a generational ordering for the selected three or more virtual machine images. The analysis may be performed without use of temporal information, such timestamps or other metadata that may include any temporal references. For instance, the management sub-system 402 may dissect each of the three or more virtual machine images into one or more data blocks and determine the block structure for each of these three or more virtual machine images. The management sub-system 402 may compare the hashed data blocks for each of these three or more dissected virtual machine images to identify any differences and similarities among the three or more dissected virtual machine images. In an embodiment, the management sub-system 402 creates a generational ordering for the three or more virtual machine images by identifying one or more series of successive changes throughout the hashed data blocks for each of these three or more virtual machine images. For instance, as a virtual machine image is modified to generate a new virtual machine image, elements of the original virtual machine image are preserved within the hashed data blocks of this new virtual machine image. Any successive changes to the virtual machine image are preserved within successive generations of the virtual machine image. Thus, by utilizing three or more virtual machine images, it may be possible to identify the generational ordering for these three or more virtual machine images, as successive changes through each generation may be preserved.

Figure 5:
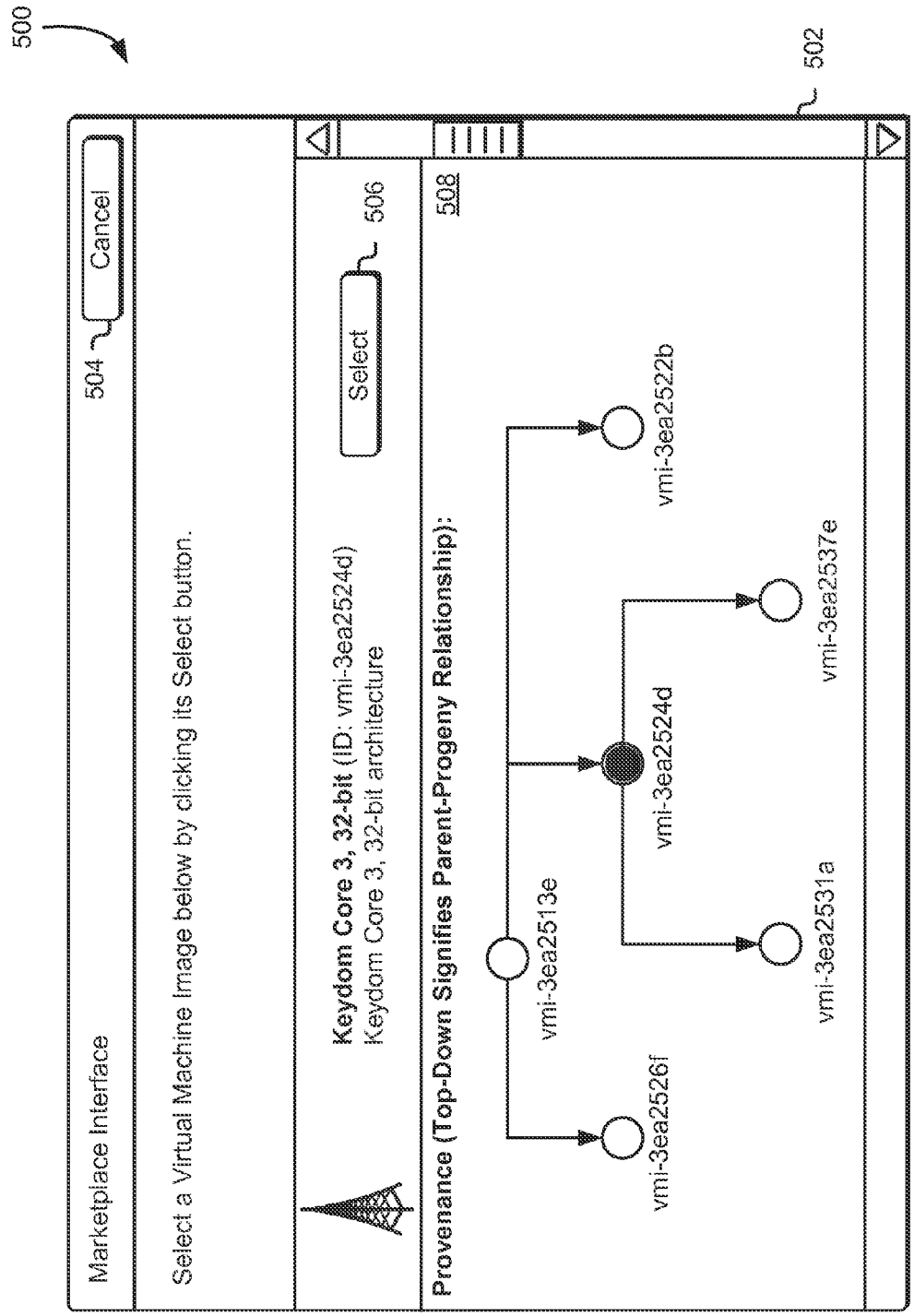
FIG. 5 shows an illustrative example of an environment that includes an interface for selecting a virtual machine image and viewing the provenance of the selected virtual machine image in accordance with at least one embodiment.

As noted above, the virtual computer system service may provide customers with a marketplace interface, which customers of the computing resource service provider may utilize to select a virtual machine image for instantiation. The virtual computer system service may, upon selection of a virtual machine image or automatically, supplement the marketplace interface to include a graphical representation of the provenance for a particular virtual machine image. Accordingly, FIG. 5 shows an illustrative example of an environment 500 that includes an interface 502 for selecting a virtual machine image and viewing the provenance of the selected virtual machine image in accordance with at least one embodiment. The interface 502 may enable customers of the computing resource service provider to select one or more available virtual machine images for instantiation, as well as other information related to these virtual machine images. For instance, the virtual computer system service may include information for each virtual machine image that may be used to determine whether the virtual machine image has been provided by a trusted vendor.

Once the customer has determined which virtual machine image he/she wants to utilize to create the new virtual machine instance, the customer may, through the interface 502, utilize a select button 506 next to the listed virtual machine image to select the virtual machine image. The virtual computer system service, upon detecting that the customer has utilized the select button 506 for a particular virtual machine image, may obtain the virtual machine image from a virtual machine image data store and make the virtual machine image available such that the customer may access the virtual computer system service, select the virtual machine image from a list of acquired virtual machine images and instantiate the virtual machine image onto a physical host to enable the customer to utilize the newly created virtual machine instance. Additionally, the virtual computer system service, upon detecting that the customer has utilized the select button 506 for a particular virtual machine image, may obtain the provenance for the selected virtual machine image. For instance, the virtual computer system service may compare the selected virtual machine image to other virtual machine images stored within a virtual machine image data store (e.g., utilizing file structure and/or hashed data block structure) to determine the provenance for the selected virtual machine image. Alternatively, if the provenance for the selected virtual machine image was previously determined and stored within metadata for the selected virtual machine image, the virtual computer system service may obtain this metadata to determine the provenance of the selected virtual machine image.

Once the virtual computer system service has determined the provenance of the selected virtual machine image, the virtual computer system service may provide a graphical representation of the provenance for the selected virtual machine image within a provenance window 508 that may be included within the interface 502. The virtual computer system service may populate the provenance window 508 with a graphical representation of a logical data tree structure for the selected virtual machine image. For instance, as illustrated in FIG. 5, the provenance window 508 includes a logical data tree structure for the selected virtual machine image above. This graphical representation of the logical data tree structure may illustrate the location of the selected virtual machine image within this structure, as well as any antecedents and/or descendants of the selected virtual machine image. The virtual computer system service may configure the provenance window 508 to enable customers of the computing resource service provider to select any of these illustrated antecedents and/or descendants for instantiation if the customer so desires.

The virtual computer system service may further configure the interface 502 to include one or more other buttons for use by the customer. For instance, as illustrated in FIG. 5, the interface 502 may include a cancel button 508, which a customer may utilize to exit the interface 502 and thereby cancel his/her request to acquire the image. It should be noted that the interface 502 illustrated in FIG. 5 is presented for the purpose of illustration and, accordingly, may include one or more additional elements or may exclude one or more elements illustrated in FIG. 5. For instance, the interface 502 may include one or more tabs that include a listing of virtual machine images that have not been authenticated by the virtual computer system service. Thus, a customer may be able to select a virtual machine image that has not been authenticated at his/her own risk.

Figure 6:
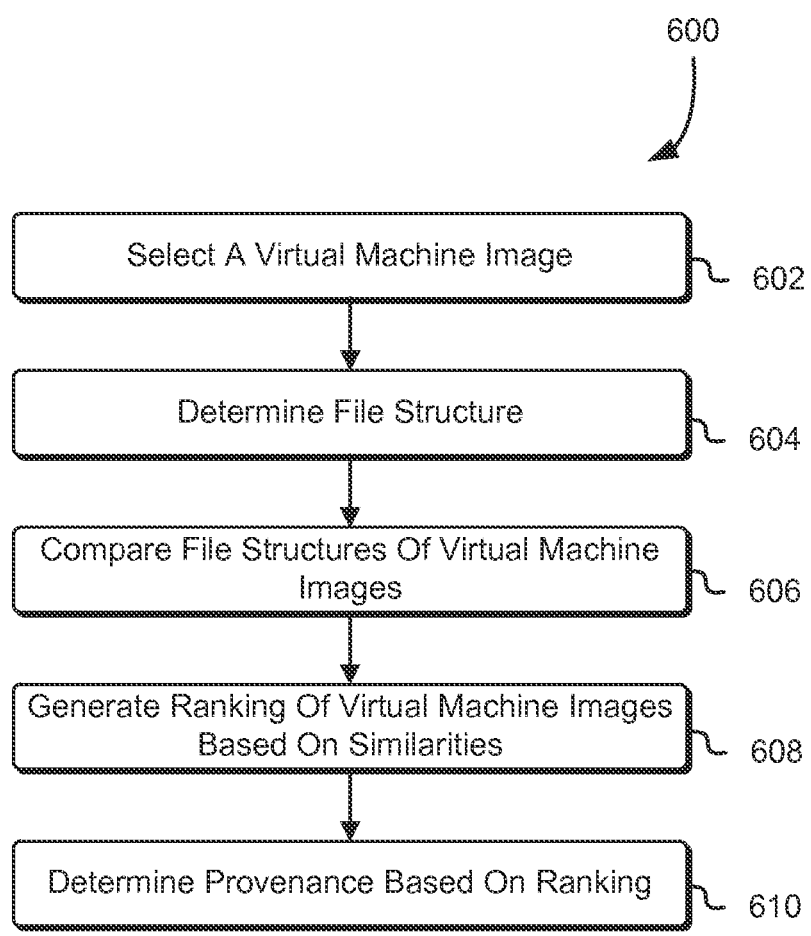
FIG. 6 shows an illustrative example of a process for determining the provenance of one or more virtual machine images based at least in part on the file structure of the virtual machine images in accordance with at least one embodiment.

As noted above, the virtual computer system service may determine the provenance for a particular virtual machine image by comparing the file structure of the particular virtual machine image to the file structure for other virtual machine images stored within a virtual machine image data store. Accordingly, FIG. 6 shows an illustrative example of a process 600 for determining the provenance of one or more virtual machine images based at least in part on the file structure of the virtual machine images in accordance with at least one embodiment. The process 600 may be performed by aforementioned virtual computer system service, which may be configured to receive requests from one or more administrators to determine the provenance for a selected virtual machine image. Alternatively, the virtual computer system service may be configured to determine the provenance for one or more virtual machine images in response to a triggering event (e.g., detection of an issue associated with a virtual machine image, selection of a virtual machine image within a marketplace interface, etc.) or at certain time intervals. The virtual computer system service may further be configured to interact with a marketplace interface to generate a graphical representation of the provenance for a virtual machine image upon selection by a customer.

In order to determine the provenance for a particular virtual machine image, the virtual computer system service may select 602 a virtual machine image for analysis. This particular virtual machine image may be selected in response to one or more triggering events. For instance, an administrator, through an interface provided by the virtual computer system service, may specify that he/she would like to obtain the provenance for a particular virtual machine image. Alternatively, the virtual computer system service may select the particular virtual machine image in response to detecting an issue associated with this virtual machine image, making it imperative to determine the provenance for this virtual machine image and determine the impact of the detected issue. In another instance, the particular virtual machine image may be selected in response to detecting that a customer has selected, through a marketplace interface, this particular virtual machine image for instantiation. Thus, the virtual computer system service may obtain the provenance for this virtual machine image in order to generate a graphical representation of the provenance for this virtual machine image.

Once the virtual computer system service has selected a particular virtual machine image, the virtual computer system service may determine 604 the file structure for this virtual machine image. The virtual computer system service may utilize one or more heuristics to identify the logical data tree structure of the selected virtual machine image to determine the file structure. For instance, the virtual computer system service may begin determining the file structure of the virtual machine image by selecting a root directory of the image and determining the files and directories that may be included therein. If there is a directory present, the virtual computer system service may access the directory and proceed further into the virtual machine image file structure until the virtual computer system service identifies a terminal node within the logical data tree structure (e.g., a location within the virtual machine image that does not include any additional directories). The virtual computer system service may graph the logical data tree structure for the selected virtual machine image up to these terminal nodes for all directories. While logical data tree structures are used extensively throughout the present disclosure for the purpose of illustration, other file structures may exist for these virtual machine images, necessitating alternative heuristics for determining the file structure of the selected virtual machine image. For instance, if the virtual machine image is organized utilizing one or more pages, the virtual computer system service may utilize a cellular multi-list scheme to identify the location of various files and data stored within the virtual machine image.

The virtual computer system service, upon determining the file structure for the selected virtual machine image, may access a virtual machine image data store to compare 606 the file structure of the selected virtual machine image to other virtual machine images stored within the data store. For instance, the virtual computer system service may utilize the same one or more heuristics utilized to determine the file structure of the selected virtual machine image to determine the file structure of these other virtual machine images within the data store. Upon determination of these file structures, the virtual computer system service may be able to determine any similarities and differences among the various file structures and identify any variances that may be indicative of lineage. For example, the virtual computer system service may overlay the file structure for the selected virtual machine image over the file structure for each of these other virtual machine images to identify any discrepancies (e.g., added/removed directories and/or files). Further, the virtual computer system service may determine one or more characteristics of similar files and directories to identify the antecedent or descendant.

Once the virtual computer system service has compare the file structure for the selected virtual machine image to the file structures for the virtual machine images stored within the virtual machine image data store, the virtual computer system service may generate 608 a ranking of the various virtual machine images based at least in part on any similarities between the selected virtual machine image and these other virtual machine images. For instance, as noted above, if the virtual computer system service has analyzed the logical tree structure of the virtual machine images, the virtual computer system service may identify the similarities among these virtual machine images based at least in part on the logical data tree structure of these virtual machine images. For example, for each virtual machine image, the logical tree structure may differ with regard to the particular nodes (e.g., files and/or directories) that comprise the virtual machine image. The ranking may be based at least in part on the hierarchical nature of the nodes included within the logical data tree structures, starting at a root node for all virtual machine images and analyzing the structures to identify any differences that may arise. A higher ranking may be assigned for less dissimilarity discovered deeper within the logical tree structures (e.g., further away from the root node). In some embodiments, the virtual computer system service may only maintain a ranking for a select number of virtual machine images. For instance, if the virtual computer system service is configured to identify only immediate antecedents and descendants of the selected virtual machine image, the virtual computer system service may maintain a ranking for a certain number of virtual machine images, while omitting others that may be too dissimilar to the selected virtual machine image.

Based at least in part on the generated ranking of the virtual machine images stored within the virtual machine image data store, the virtual computer system service may determine 68 the provenance for the selected virtual machine image. For instance, the highest ranking virtual machine images may correspond to direct antecedents and/or descendants of the selected virtual machine image. Thus, the virtual computer system service may further evaluate these highest ranking virtual machine images to determine whether these are antecedents or descendants of the selected virtual machine image. For example, if a high ranking virtual machine image includes one or more files and/or directories that include a more recent time stamp, then the virtual computer system service may determine that this virtual machine image is a descendant of the selected virtual machine image. Once the virtual computer system service has determined the provenance for the selected virtual machine image, the virtual computer system service may provide the provenance to one or more entities. For instance, the virtual computer system service may provide this provenance to an administrator upon request. Additionally, the virtual computer system service may utilize the provenance to supplement a marketplace interface and generate a graphical representation of the provenance, which may be used by customers of the computing resource service provider to visually determine the provenance of the selected virtual machine image and, potentially, select alternative virtual machine images.

Figure 7:
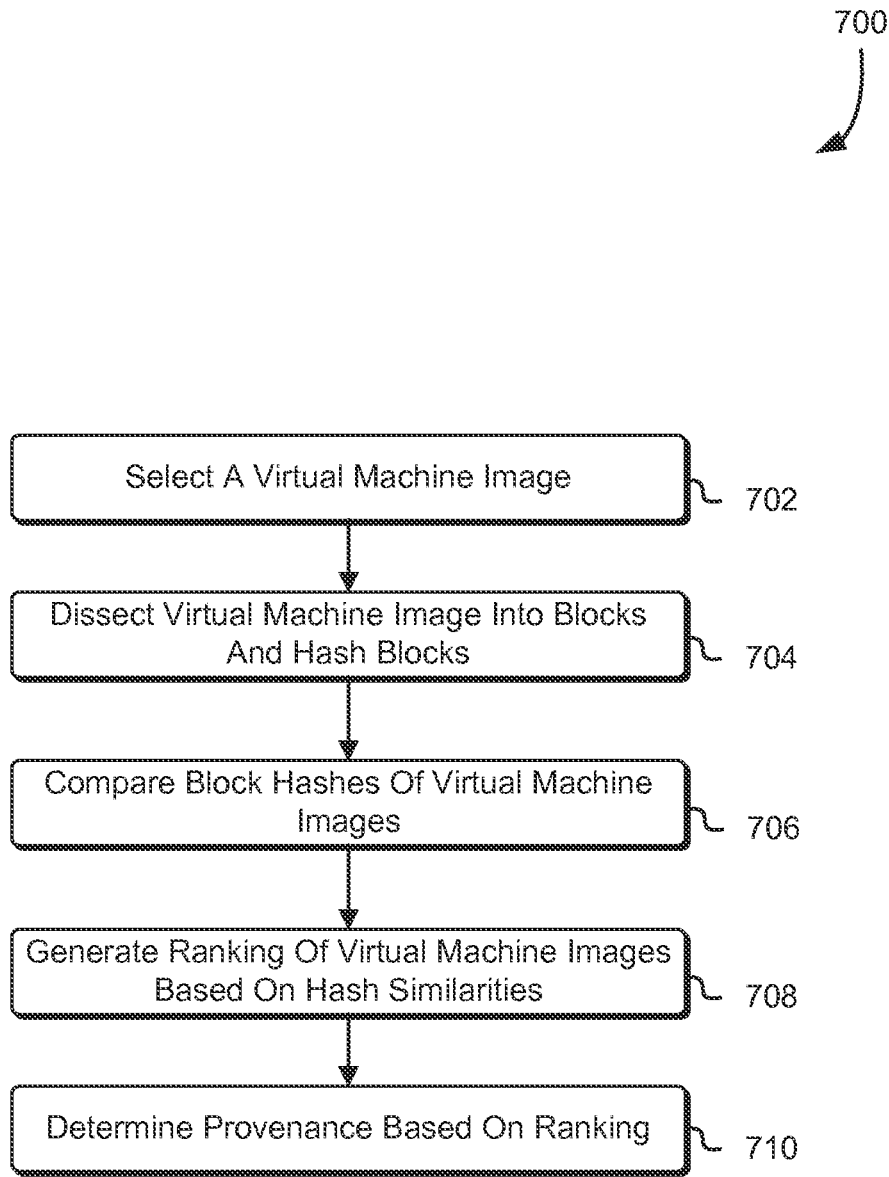
FIG. 7 shows an illustrative example of a process for determining the provenance of one or more virtual machine images based at least in part on hashing of the blocks that comprise the virtual machine images in accordance with at least one embodiment.

As noted above, the virtual computer system may dissect a virtual machine image into one or more constituent data blocks. The virtual computer system service may hash these data blocks and compare the block structure of this selected virtual machine image to the block structure of a plurality of virtual machine images to identify the provenance of the selected virtual machine image. Accordingly, FIG. 7 shows an illustrative example of a process 700 for determining the provenance of one or more virtual machine images based at least in part on hashing of the data blocks that comprise the virtual machine images in accordance with at least one embodiment. The process 700 may be performed by the aforementioned virtual computer system service, which may be configured to dissect one or more virtual machine images into their constituent data blocks and, subsequently, hash these data blocks. Further, similar to the process 600 described above, the virtual computer system service may be configured to be configured to receive requests from one or more administrators to determine the provenance for a selected virtual machine image. Alternatively, the virtual computer system service may be configured to determine the provenance for one or more virtual machine images in response to a triggering event (e.g., detection of an issue associated with a virtual machine image, selection of a virtual machine image within a marketplace interface, etc.) or at certain time intervals. The virtual computer system service may further be configured to interact with a marketplace interface to generate a graphical representation of the provenance for a virtual machine image upon selection by a customer.

In order to determine the provenance for a particular virtual machine image, the virtual computer system service may select 702 a virtual machine image for analysis. This particular virtual machine image may be selected in a similar manner as that described above in connection with the process 600. For instance, an administrator, through an interface provided by the virtual computer system service, may specify that he/she would like to obtain the provenance for a particular virtual machine image. Alternatively, the virtual computer system service may select the particular virtual machine image in response to detecting an issue associated with this virtual machine image, making it imperative to determine the provenance for this virtual machine image and determine the impact of the detected issue. In another instance, the particular virtual machine image may be selected in response to detecting that a customer has selected, through a marketplace interface, this particular virtual machine image for instantiation. Thus, the virtual computer system service may obtain the provenance for this virtual machine image in order to generate a graphical representation of the provenance for this virtual machine image.

Once the virtual computer system service has selected a virtual machine image, the virtual computer system service may dissect 704 the virtual machine image into one or more constituent data blocks and, subsequently, hash these data blocks. For instance, the virtual computer system service may determine an appropriate data block size for each data block and dissect the virtual machine image to generate a number data blocks consistent with this specified block size. For example, if the virtual computer system service is configured to perform one or more high fidelity analyses to identify all differences between the selected virtual machine image and other virtual machine images, the virtual computer system service may dissect the selected virtual machine image into smaller data blocks. Alternatively, if a rapid analysis needs to be performed, such that time is of the essence or sufficient processing capability is not available, the virtual computer system service may dissect the selected virtual machine image into larger data blocks.

The virtual computer system service, upon dissecting the selected virtual machine image into one or more constituent data blocks and upon hashing these data blocks, may compare 706 the block structure of the selected virtual machine image to the block structure of other virtual machine images stored within the virtual machine image data store. For instance, the virtual computer system service may, for each data block, compare the hashes for the data blocks to identify any differences that may exist between the selected virtual machine image and the virtual machine image used for the comparison. The virtual computer system service may record these differences for further processing as will be described below. In some embodiments, if the virtual computer system service is unable to identify sufficient similarity between the selected virtual machine image and the other virtual machine images stored within the virtual machine image data store, the virtual computer system service may increase the fidelity of the analysis by dissecting the virtual machine images further to generate smaller hashed data blocks. This may enable the virtual computer system service to more accurately identify the differences and similarities among these virtual machine images.

Similar to the process 600 described above, the virtual computer system service may generate 708 a ranking of the various virtual machine images based at least in part on any similarities between the selected virtual machine image and these other virtual machine images. For instance, the virtual computer system service may generate the ranking of these other virtual machine images based at least in part on similarities in the hashed data blocks of these other virtual machine images and the selected virtual machine images. A higher ranking may be assigned to a virtual machine image that more closely matches the block structure of the selected virtual machine image. Thus, a higher ranking may correspond to a virtual machine image that is a direct antecedent or descendant of the selected virtual machine image. In some embodiments, the virtual computer system service may only maintain a ranking for a select number of virtual machine images. For instance, if the virtual computer system service is configured to identify only immediate antecedents and descendants of the selected virtual machine image, the virtual computer system service may maintain a ranking for a certain number of virtual machine images, while omitting others that may be too dissimilar to the selected virtual machine image.

Based at least in part on the generated ranking of the virtual machine images stored within the virtual machine image data store, the virtual computer system service may determine 78 the provenance for the selected virtual machine image. The virtual computer system service may the highest ranking virtual machine images to determine whether these are antecedents or descendants of the selected virtual machine image. Once the virtual computer system service has determined the provenance for the selected virtual machine image, the virtual computer system service may provide the provenance to one or more entities. For instance, the virtual computer system service may provide this provenance to an administrator upon request. Additionally, the virtual computer system service may utilize the provenance to supplement a marketplace interface and generate a graphical representation of the provenance, which may be used by customers of the computing resource service provider to visually determine the provenance of the selected virtual machine image and, potentially, select alternative virtual machine images.

Figure 8:
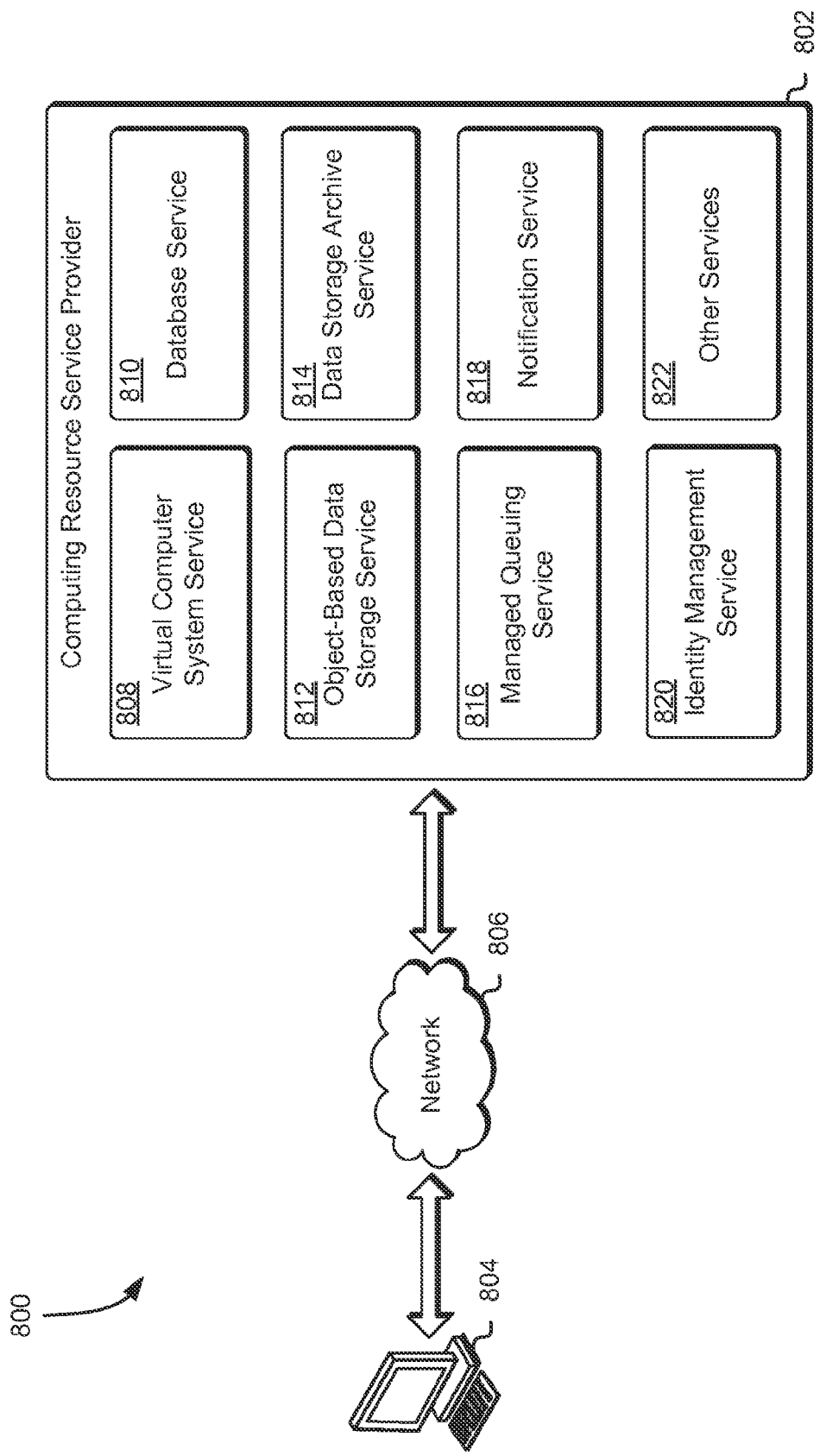
FIG. 8 shows an illustrative example of an environment in which various embodiments can be implemented.

FIG. 8 shows an illustrative example of an environment in which various embodiments can be implemented. In the environment 800, a computing resource service provider 802 may provide a variety of services to a customer 804 or other users. The customer 804 may be an organization that may utilize the various services provided by the computing resource service provider 802 to remotely generate and maintain one or more resources and provide a mapping of user roles for use within a customer network to enable management of one or more delegated access permissions to define a level of access for users of his or her resources. As illustrated in FIG. 8, the customer 804 may communicate with the computing resource service provider 802 through one or more communications networks 806, such as the Internet. Some communications from the customer 804 to the computing resource service provider 802 may cause the computing resource service provider 802 to operate in accordance with various techniques described herein or variations thereof.

As noted above, a computing resource service provider 802 may provide various computing resource services to its customers. For instance, in this particular illustrative example, the computing resource service provider 802 provides at least seven types of services. The services provided by the computing resource service provider, in this example, include a virtual computer system service 808, a database service 810, an object-based data storage service 812, a data storage archive service 814, a managed queuing service 816, a notification service 818, an identity management service 820 and one or more other services 822, although not all embodiments of the present disclosure will include all such services and additional services may be provided in addition to or as an alternative to services explicitly described herein.

The virtual computer system service 808 may be a collection of computing resources configured to instantiate virtual machine instances onto virtual computer systems on behalf of the customers 804 of the computing resource service provider 802. Customers 804 of the computing resource service provider 802 may interact with the virtual computer system service 808 to provision and operate virtual computer systems that are instantiated on physical computing devices hosted (e.g., physical hosts) and operated by the computing resource service provider 802. The virtual computer systems may be used for various purposes, such as to operate as servers supporting a website. Other applications for the virtual computer systems may be to support database applications, electronic commerce applications, business applications and/or other applications.

The virtual computer system service 808 may be configured to identify the provenance for one or more virtual machine images that may be used to instantiate these virtual machine instances. For instance, in some embodiments, the virtual computer system service 808 may select and determine the file structure of a particular virtual machine image. The file structure of this selected virtual machine image may be compared to the file structure of one or more other virtual machine images to identify the similarities and difference between this selected virtual machine images and these other virtual machine images. This may enable the virtual computer system service 808 to generate a ranking that is based at least in part on these identified similarities and differences. The ranking of these other virtual machine images may be utilized to identify any antecedents and descendants of the selected virtual machine image.

In an alternative embodiment, the virtual computer system service 808 dissects the selected virtual machine image into one or more constituent data blocks, that may be hashed for analysis. Subsequently, the virtual computer system service 808 may compare the block structure of this selected virtual machine image to the block structure of other virtual machine images to identify any similarities and differences among these virtual machine images. This may enable the virtual computer system service 808 to generate a ranking of these other virtual machine images in order to determine the antecedents and descendants of the selected virtual machine image.

The database service 810 may be a collection of computing resources that collectively operate to run one or more databases for one or more customers 804. Customers 804 of the computing resource service provider 802 may operate and manage a database from the database service 810 by utilizing appropriately configured API calls. This, in turn, may allow a customer 804 to maintain and potentially scale the operations in the database.

The object-based data storage service 812 may comprise a collection of computing resources that collectively operate to store data for a customer 804. The data stored in the data storage service 812 may be organized into data objects. The data objects may have arbitrary sizes except, perhaps, for certain constraints on size. Thus, the object-based data storage service 812 may store numerous data objects of varying sizes. The object-based data storage service 812 may operate as a key value store that associates data objects with identifiers of the data objects which may be used by the customer to retrieve or perform other operations in connection with the data objects stored by the object-based data storage service 812. Access to the object-based data storage service 812 may be through appropriately configured API calls.

The data storage archive service 814 may comprise a collection of computing resources that collectively operate to provide storage for data archiving and backup of customer data. The data storage archive service 814 may thus be configured to persistently store data that may be infrequently accessed and for which long retrieval times are acceptable to a customer 804 utilizing the service. A customer 804 may interact with the data storage archive service 814 to generate one or more archives. Each archive may represent one or more data files that may be combined to form the archive. Accordingly, a customer 804, through appropriately configured API calls to the service, may upload and retrieve archives from the data storage archive service 814 and monitor the retrieval of these archives, as each retrieval job may typically require several hours to complete.

The managed queuing service 816 may be a collection of computing resources configured to enable customers 804 to store one or more messages in queues for use by one or more services provided by the computing resource service provider 802. Each message that is stored in a queue may comprise one or more appropriately configured API calls which, when processed by the recipient service, may cause the service to perform one or more actions. Alternatively, each message may comprise any variation of text, such as programming code, URLs for data objects and other statements.

The notification service 818 may be a collection of computing resources configured to enable customers 804 to send and receive notifications through a communications network 806. A customer 804 may utilize an interface, provided by the computing resource service provider 802, to create or subscribe to one or more subjects to which one or more messages may be published through. For instance, a customer 804 may use the interface to create a new subject and subscribe to this subject by specifying that any messages published to the subject may be transmitted to a particular location (e.g., electronic mail address, one or more servers, an existing queue within the managed queuing service 816, etc.). Accordingly, when a customer 804 publishes a message to the subject, the message may be transmitted to each recipient subscribed to the subject.

The identity management service 820 may provide a variety of services to enable customers 804 to define a level of access to other services, such as those illustrated in FIG. 8, provided by the computing resource service provider 802 and to define a level of access to resources provided by the customers 804 and other entities. Accordingly, a customer 804 may access the identity management service 820 to access his/her customer account to create and manage one or more mappings of user roles for defining a level of access to resources within a customer network, which may be used by identity management service 820 to define a level of access to customer resources for users and groups that may utilize the services provided by the computing resource service provider 802. A customer 804 may further utilize the identity management service 820 to generate one or more policies, which may be used to define a level of access to resources and services.

Figure 9:
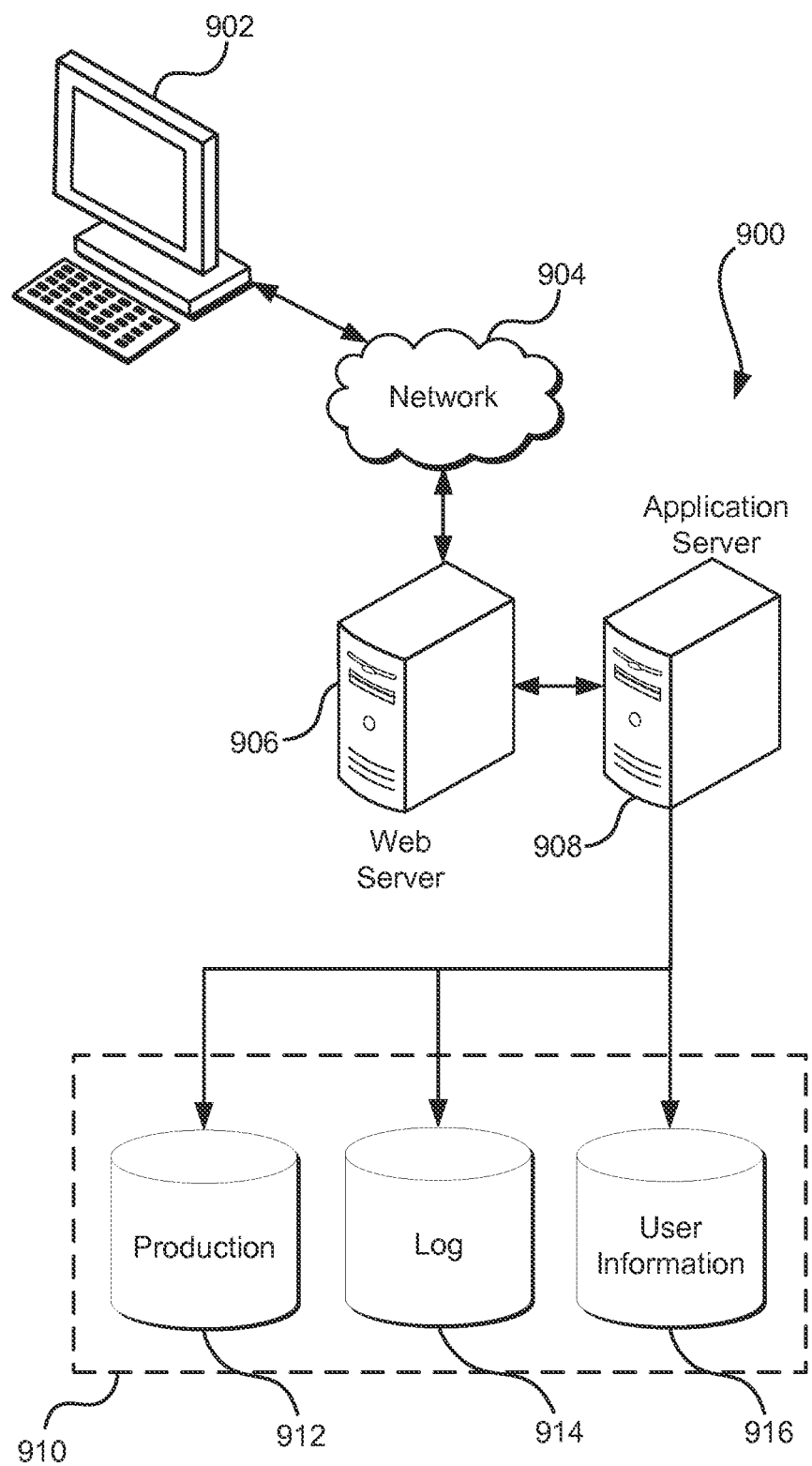
FIG. 9 shows an illustrative example of an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 98 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for determining a generational ordering for a first virtual machine image, comprising:
  under the control of one or more computer systems configured with executable instructions, determining, for the first virtual machine image, first information generated based at least in part on contents of the first virtual machine image, wherein the determined first information is based at least in part on a file structure of the first virtual machine image by selecting a root directory of the first virtual machine image and determining the files and directories that may be included therein;

determining, for a second virtual machine image, second information generated based at least in part on contents of the second virtual machine image, wherein the determined second information is based at least in part on a file structure of the second virtual machine image;

determining, for each third virtual machine image of a set of third virtual machine images, third information generated based at least in part on contents of each third virtual machine image, wherein the determined third information is based at least in part on a file structure of each third virtual machine image of the set of third virtual machine images;

generating a set of similarity scores by at least, for the second virtual machine image and each third virtual machine image of the set of third virtual machine images, calculating a similarity score based at least in part on the determined first information generated based at least in part on the contents of the first virtual machine image, the determined second information generated based at least in part on contents of the second virtual machine image and the determined third information generated based at least in part on contents of each third virtual machine image;

determining, based at least in part on the generated set of similarity scores, the generational ordering for the first, the second, and the third virtual machine images; and providing information that indicates the determined generational ordering.

2. The computer-implemented method of claim 1, wherein the determined first information, the determined second information and the determined third information comprise hashed data blocks generated based at least in part on the contents of the first virtual machine image, the contents of the second virtual machine image and the contents of each third virtual machine image of the set of third virtual machine images.

3. The computer-implemented method of claim 1, wherein:

determining, based at least in part on the generated set of similarity scores, the generational ordering for the first virtual machine image includes determining a ranking for the second virtual machine image and the set of third virtual machine images based at least in part on the generated set of similarity scores; and determining the generational ordering based at least in part on the determined ranking.

4. The computer-implemented method of claim 1, wherein the similarity score is calculated based at least in part on any identified differences and a location of the identified differences within the file structures.

5. The computer-implemented method of claim 1, wherein a tree edit distance is calculated between a selected virtual machine image and another virtual machine image.

6. The tree edit distance of claim 5, wherein the tree edit distance is based at least in part on one or more hypothetical operations performed to transform a selected virtual machine image file structure into the file structure of another virtual machine image.

7. A system comprising:
one or more processors; and
at least one computing device configured with one or more processors to:
determine, for a first block of data of a set of two or more blocks of data dissected from a first virtual machine image, first information generated based at least in part on the first block of data;

generate a set of measurements for each other block of data of the set of two or more blocks of data based at least in part on the determined first information and other information generated based at least in part on each other block of data of a set of two or more blocks of data dissected from other virtual machine images, wherein the determined first information and the other information are based at least in part on file structures of the first virtual machine image and each other block of data of the set of two or more blocks of data, wherein determined the file structure of the first virtual machine image and other virtual machine images by selecting a root directory of the first virtual machine image and a root directory of the other virtual machine and determining the files and directories that may be included therein; and determine, based at least in part on the generated set of measurements, a generational ordering for the first virtual machine image and the other virtual machine images.

8. The system of claim 7, wherein the determined first information and the other information comprise hashed data blocks generated based at least in part on data of the first block of data and data of each other block of data of the set of two or more blocks of data.

9. The system of claim 7, wherein the one or more services are further configured to:
determine a ranking for the set of two or more blocks of data based at least in part on the generated set of measurements; and
determine the generational ordering based at least in part on the determined ranking.

10. The system of claim 7, wherein generating the set of measurements for each other block of data of the set of two or more blocks of data based at least in part on the determined first information and the other information is performed without use of temporal information.

11. The system of claim 7, wherein the one or more services are further configured to provide information that indicates the determined generational ordering to enable performance of one or more administrative actions based at least in part on the determined generational ordering.

12. The system of claim 7, wherein the one or more services are further configured to:
detect one or more issues associated with the first block of data; and
determine the first information in response to detection of the one or more issues.

13. The system of claim 7, wherein the one or more services are further configured to utilize the determined generational ordering for the first block of data to generate a graphical representation of the determined generational ordering and incorporate the generated graphical representation of the determined generational ordering within an interface for selecting blocks of data.

14. A non-transitory computer-readable storage medium having stored thereon executable instructions that, when executed by one or more processors of a computer system, cause the computer system to at least:
generate, based at least in part on a first information determined based at least in part on data included within a first block of data of a set of two or more blocks of data dissected from a first virtual machine image and other information generated based at least in part on data included within each other block of data of a set of two or more blocks of data dissected from a other virtual machine images, a set of measurements for each other block of data of the set of two or more blocks of data, wherein the determined first information and the other information are based at least in part on file structures of the first bock of data and each other block of data of the set of two or more blocks of data, wherein determined the file structure of the first virtual machine image and other virtual machine images by selecting a root directory of the first virtual machine image and a root directory of the other virtual machine images and determining the files and directories that may be included therein; and determine, based at least in part on the generated set of measurements, a generational ordering for the first virtual machine image and the other virtual machine images.

15. The non-transitory computer-readable storage medium of claim 14, wherein the instructions further comprise instructions that, when executed by the one or more processors, cause the computer system to utilize the determined generational ordering for the set of two or more blocks of data to generate a graphical representation of the determined generational ordering and incorporate the generated graphical representation of the determined generational ordering within an interface for selecting blocks of data.

16. The non-transitory computer-readable storage medium of claim 14, wherein the instructions further comprise instructions that, when executed by the one or more processors, cause the computer system to:

detect one or more issues associated with the first block of data; and determine the first information in response to detection of the one or more issues.

17. The non-transitory computer-readable storage medium of claim 14, wherein the determined first information and the other information comprise hashed data blocks generated based at least in part on data of the first block of data and data of each other block of data of the set of two or more blocks of data.

18. The non-transitory computer-readable storage medium of claim 14, wherein generating the set of measurements for each other block of data of the set of two or more blocks of data based at least in part on the determined first information and the other information is performed without use of temporal information.

19. The non-transitory computer-readable storage medium of claim 14, wherein the instructions further comprise instructions that, when executed by the one or more processors, cause the computer system to:

determine a ranking for the set of two or more blocks of data based at least in part on the generated set of measurements; and determine the generational ordering based at least in part on the determined ranking.

20. The non-transitory computer-readable storage medium of claim 14, wherein the instructions further comprise instructions that, when executed by the one or more processors, cause the computer system to provide information that indicates the determined generational ordering to enable performance of one or more administrative actions based at least in part on the determined generational ordering.

* * * * *